United States Patent [19]

Boltz, Jr.

[11] 3,873,764

[45] Mar. 25, 1975

[54] SPEED CORRECTION SYSTEM FOR A VIDEO DISK PLAYBACK SYSTEM

[75] Inventor: Charles D. Boltz, Jr., Greenwood, Ind.

[73] Assignee: RCA Corporation, New York, N.Y.

[22] Filed: Oct. 5, 1973

[21] Appl. No.: 403,992

[30] Foreign Application Priority Data

Mar. 20, 1973 United Kingdom .............. 13265/73

[52] U.S. Cl...... 178/6.6 R, 178/6.6 R, 178/6.6 DD, 178/6.6 TC, 179/100.1 S, 179/100.4 E, 360/73

[51] Int. Cl........................ G11b 17/00, G11b 19/28

[58] Field of Search...... 178/6.6 DD, 6.6 TC, 6.6 R, 178/6.6 P; 179/100.1 S, 100.3 D, 100.4 E; 360/70, 73

[56] References Cited

UNITED STATES PATENTS

| | | | |
|---|---|---|---|
| 3,530,258 | 9/1970 | Gregg et al. | 174/100.3 V |
| 3,711,641 | 1/1973 | Palmer | 178/6.6 DD |
| 3,718,754 | 2/1973 | Goshima et al. | 360/73 |
| 3,787,615 | 1/1974 | Foerster et al. | 360/70 |

*Primary Examiner*—Bernard Konick
*Assistant Examiner*—Stewart Levy
*Attorney, Agent, or Firm*—Eugene M. Whitacre; William H. Meagher

[57] ABSTRACT

In a video disc system for recovering recorded signals from a video disc by a stylus by establishing relative motion between the disc and the stylus, a speed correction system is provided. A low frequency error correction system is employed to maintain the average speed of the disc at a predetermined speed. A high frequency error correction system is used to compensate for the deviation of the instantaneous relative speed between the disc and the stylus from the average speed of the disc. Means responsive to the presence of recorded signals in the output of the stylus are provided for enabling the low frequency error correction system. Means are provided for delaying the operation of the high frequency error correction system relative to enabling of the low frequency error correction system, permitting stabilization of the high frequency error correction system response and adjustment of the average speed of the disc to the predetermined speed, to precede operation of the high frequency error correction system.

11 Claims, 5 Drawing Figures

SPEED CORRECTION SYSTEM FOR A VIDEO DISK PLAYBACK SYSTEM

BACKGROUND OF THE INVENTION

The present invention pertains to a speed correction system suitable for use with a video disc system.

In certain video disc systems, video information is recorded by means of geometric variations in the bottom of a smooth spiral groove on the surface of a disc. The disc surface includes a layer of conductive material which is preferably covered with a thin coating of dielectric material. A stylus engages the spiral groove and includes a conductive surface which, together with the conductive material and dielectric coating of the disc, form a capacitor. When the disc is rotated, an edge of the conductive surface of the stylus, while riding in the disc groove, recovers capacitive variations due to the geometric variations in the bottom of the spiral groove. The capacitive variations, which represent recorded video information (such as the NTSC format), are applied to a suitable signal processing circuit and electrical signals obtained therefrom are then coupled to a conventional television receiver for reproduction. The variable capacitor concept as applied to video disc systems is described in detail in the copending U.S. Pat. application, Ser. No. 126,772, filed Mar. 22, 1971, now U.S. Pat. No. 3,842,194, for J. K. Clemens, entitled "Information Records and Recording/Playback Systems Therefor," also assigned to the present assignee.

The stylus including a conductive surface is attached to the free end of a stylus arm. The stylus arm is freely pivoted at its other end on a support member attached to a stylus arm carrying structure. The stylus arm carrying structure desirably incorporates suitable feed drive mechanism for driving the stylus arm assembly transversely across the disc in proper time relationship with the rotational speed of the disc. The feed drive mechanism arrangement drives the stylus radially inward toward the center of rotation of the disc to provide approximate lateral tracking of the groove, whereby the attitude of the stylus conductive surface in the groove may be held relatively constant.

In video disc systems of the aforementioned Clemens type (U.S. Pat. application, Ser. No. 126,772), it is desirable to maintain the relative motion between the disc and the stylus at a predetermined speed (illustratively, 450 rpm) to obtain accurate reproduction of the recorded signals. Although precise mechanical design and manufacture of the disc and playback apparatus minimize the speed errors, random residual errors sufficient to noticably affect the picture quality (e.g., by causing jitter) will remain. Moreover, additional speed errors will creep in as the playback apparatus wears during its normal use.

Speed errors result from several sources: for example, disc and turntable eccentricities disc manufacturing defects, turntable drive motor power input and load variations and wear and tear of the turntable drive system, to name a few. First, errors in the relative speed caused by the disc and turntable eccentricities and disc manufacturing defects appear at the stylus once or more each revolution. By way of example, speed errors caused by the disc mounting eccentricity will repeat at a frequency of 7.5 Hz (at disc rotational speed of 450 rpm). Speed errors caused by two disc manufacturing defects (e.g., two scratches) per groove will repeat at a frequency of 15 Hz (at disc rotational speed of 450 rpm), and so on. Expressed differently the aforementioned speed errors occur at or above the "once-around" frequency (e.g., 7.5 Hz at disc rotational speed of 450 rpm). Second, errors in the relative speed caused by the turntable drive motor input and load variations and wear and tear of the turntable drive system are likely to occur at frequencies under the "once-around" frequency. In the interest of convenience, errors under the "once-around" frequency are referred to as the low frequency errors, and errors at or above the "once-around" frequency are referred to as the high frequency errors.

Pursuant to the approach of the present invention, a composite error correction system is provided. The composite error correction incorporates a low frequency and a high frequency error correction system to deal with, respectively, the low frequency and the high frequency errors. Illustrative of a form of a speed control system that may advantageously be employed as the low frequency error correction portion of the composite error correction system is the system described in the copending U.S. Pat. application, Ser. No. 284,510, filed Aug. 29, 1972, now U.S. Pat. No. 3,829,612, for B. W. Beyers Jr. entitled "Speed Control System." In such a system, the "free running" speed of the turntable (and thereby, the disc) is above the predetermined speed required for proper operation of the video disc system. A turntable braking system is used to adjust the actual speed of the turntable to the predetermined level. Means are provided for developing an error signal representative of the deviation of the average speed (the speed obtained after the high frequency errors are averaged out) of the disc from the predetermined speed. The error signal actuates the turntable braking system which is conditionable between the "brake on" condition and the "brake off" condition in a manner that minimizes the speed errors.

A speed control system of the above type is generally effective in maintaining the average speed of the disc at the predetermined speed by compensating the low frequency errors. However, the inertia of the turntable drive mechanism prevents the speed control system from effectively responding to the high frequency errors. Illustrative of a form of speed control system that may advantageously be employed as the high frequency error correction portion of the composite error correction system is the system described in the U.S. Pat. No. 3,711,641 issued to R. C. Palmer on Jan. 16, 1973, and entitled, "Velocity Adjusting System." In such systems means are provided for developing an error signal representative of the deviation of the instantaneous relative speed between the disc and the stylus from the average speed of the disc. A transducer responsive to the error signal is provided for varying the position of the stylus in relation to the disc in a manner that minimizes the speed errors.

Thus, a composite error correction system in accordance with the invention uses a low frequency error correction system for maintaining the average speed of the disc at the predetermined speed, and a high frequency error correction system for compensating deviations of the instantaneous relative speed between the disc and the stylus from the average speed of the disc. Use of the composite error correction system, however, presents the problem of avoiding deleterious interplay between the subsystems under transient conditions. Accordingly, pursuant to the approach of the present invention, the composite error correction system includes means for appropriately sequencing the operation of the low frequency and the high frequency error correction systems to avoid damaging interplay under the transient conditions.

A particular example of the transient problems confronted by a composite error correction system is present when the subsystems of the above described Beyers type and Palmer type are employed in combination. When this particular combination is used, the composite error correction system uses timing information (e.g., the horizontal sync pulses) included in the recorded signals (e.g., such as the NTSC format) for developing error signals for both subsystems. The signals are absent except when the stylus is riding in the information carrying groove and relative motion is established between the disc and the stylus. Therefore, after the video disc system is initially switched on, the signals are not recovered until the stylus is properly positioned in the information carrying groove and relative motion is established between the disc and the stylus. Due to the absence of timing information during this interim period, the low frequency error correction system has no way of knowing the speed error. In absence of knowledge of the speed error, the condition of the low frequency error correction system may be an arbitrary one. It is possible that when the video disc system is switched on, the low frequency error correction system may find itself in the "brake on" condition. If at the beginning of playback, the low frequency error correction system does find itself in the "brake on" condition, then, in spite of the fact that the actual disc speed is below the predetermined speed, the brakes would continue to engage until the signals are recovered from the disc. This may prevent the disc from ever attaining the predetermined speed and also may damage the turntable mechanism. A feature of the present invention includes means for disabling the low frequency error correction system in the absence of signals at the output of the pickup stylus.

Generally, in a video disc system employing the illustrative composite error correction system, the chronology of events is as follows. The video disc system is switched on, the low frequency error correction system brakes are disengaged, the turntable and the disc rotate at the above normal "free running" speed (because the brakes are disengaged), and the stylus arm assembly is lowered to permit the stylus to position itself in the information carrying groove on the disc. When the stylus initially descends on the disc, the elasticity of the plastic disc tends to bounce back the stylus, setting up "touch-down" oscillations. During this time the high frequency error correction system may be receiving false timing information because of (1) the above normal "free-running" speed of the disc, (2) "touch-down" oscillations of the stylus, and (3) transients in the high frequency error correction system output. This may cause the high frequency error correction system to respond haphazardly and abruptly and thereby setting up wild excursions of the stylus arm, which may be injurious to both the stylus and the disc. A feature of the present invention incorporates means for further delaying the operation of the high frequency error correction system relative to the enabling of the low frequency error correction system, permitting (a) stabilization of the high frequency error correction system, and (b) adjustment of the average speed of the disc to the predetermined speed, to precede operation of the high frequency error correction system.

Accordingly, an illustrative speed correction system embodying the principles of the present invention includes the following. A low frequency error correction system is provided for maintaining the average speed of the disc at the predetermined speed. A circuit means for developing an error signal representative of the deviation of the instantaneous relative speed between the disc and the stylus from the average speed of the disc is coupled to a transducer means. The transducer means varies the position of the stylus in relation to the disc in a manner that minimizes the error signal. A control means responsive to the absence of recorded signals at the output of the stylus disables the operation of the low frequency error correction system and the transducer means. The control means responsive to the presence of recorded signals at the output of the stylus enables the operation of the low frequency error correction system and the circuit means for developing the error signal. Means are provided for further delaying the operation of the transducer means relative to enabling of the low frequency error correction system and the circuit means for developing the error signal, permitting stabilization of the high frequency error correction circuit and adjustment of the average speed of the disc to the predetermined speed, to precede the operation of the transducer means.

The objects and advantages of the present invention will be recognized by those skilled in the art upon reading of the following detailed description and inspection of the accompanying drawings in which.

DESCRIPTION OF THE INVENTION

Figure 1:
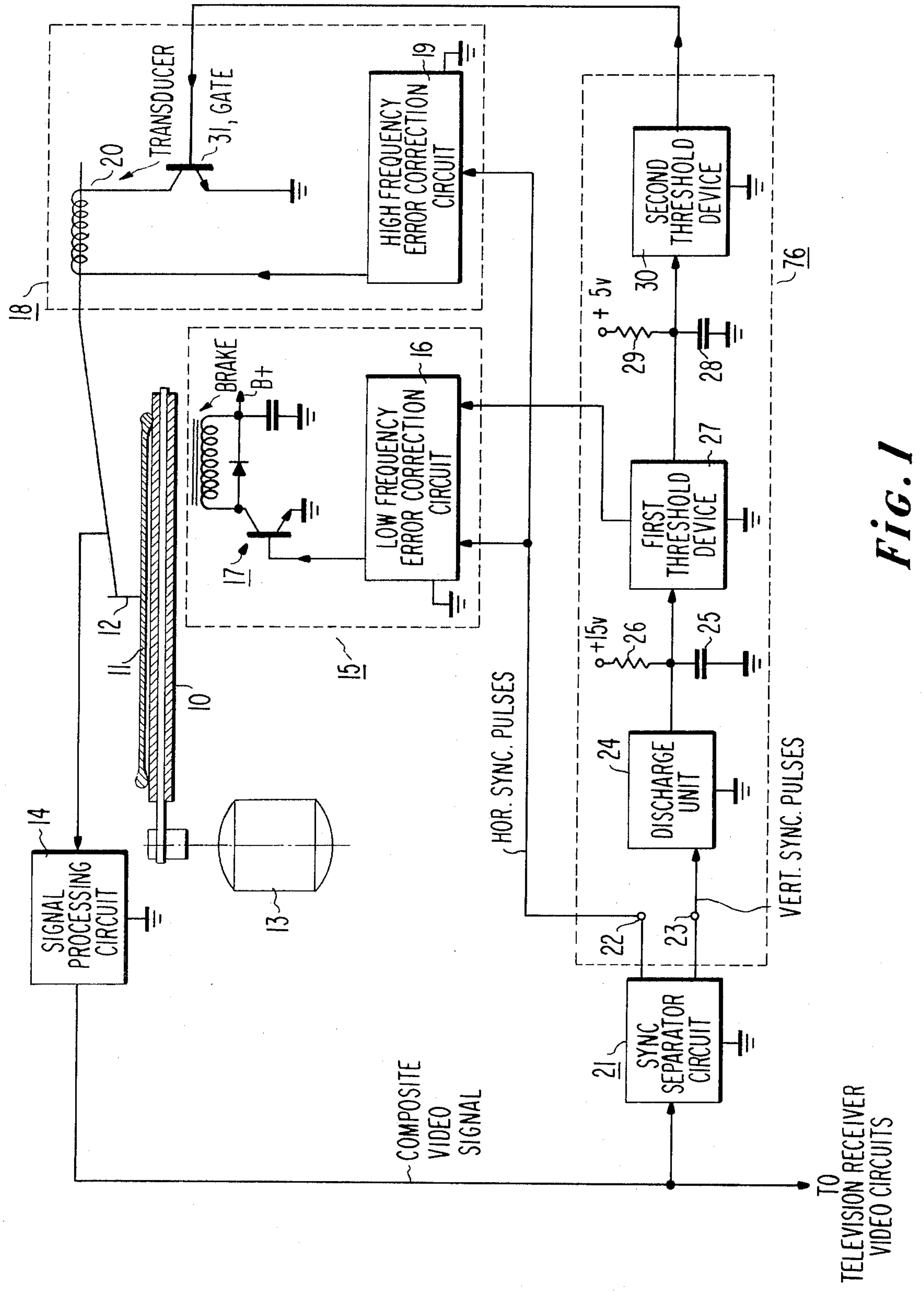
FIG. 1 is a partial block diagram of a video disc system for recovering composite video signals from a video disc employing a composite error correction system pursuant to an embodiment of the present invention.

FIG. 1 illustrates a playback apparatus comprising a motorboard having a turntable 10 rotatably mounted thereon. The playback apparatus is suitable for use in a video disc system such as disclosed in the aforementioned Clemens application (U.S. Pat. application, Ser. No. 126,772). The surface of the turntable 10 is adapted to support a disc 11. A stylus 12, including a conductive surface, is subject to positioning in an information carrying groove on the surface of the disc 11. A suitable turntable drive mechanism including a motor 13, drives the turntable 10 and thereby establishes relative motion between the disc 11 and the stylus 12. Video information is contained in geometric variations in the bottom of the smooth spiral groove of the disc. The disc surface includes a layer of conductive material which is preferably covered with a thin coating of dielectric material. The stylus 12 including the conductive surface engages the spiral groove and cooperates with the conductive material and the dielectric coating on the disc, to form a capacitor. As the disc is rotated, the stylus 12 while riding in the groove, recovers capacitive variations due to geometric variations in the bottom of the spiral groove. The capacitive variations, representing recorded video information, are applied to a suitable signal processing circuit 14 and a composite video signal obtained therefrom may be coupled to a conventional television receiver (not shown) for reproduction.

Apparatus of FIG. 1 includes a low frequency error correction system 15 for maintaining the average speed of the disc at the predetermined speed. Illustratively, the system may be of the type disclosed in the copending Beyers application (U.S. Pat. application, Ser. No. 284,510). The Beyers system includes a turntable drive mechanism which establishes relative motion between the disc and stylus at a rate above the predetermined speed required for proper reproduction of the recorded signals. A turntable braking system 17 is used to adjust the actual speed to the predetermined level. When the stylus is properly positioned in the information carrying groove and relative motion is established between the disc and stylus, capacitive variations representative of a composite video signal including regularly recurring sync components appear at the output electrode of the stylus. Typically, the regularly recurring sync components comprise the horizontal sync pulses and the vertical sync pulses. When the predetermined rate of relative speed is established between the disc and the stylus, the horizontal sync pulses will be recovered from the disc at the horizontal scanning rate (e.g., 15,734 Hz) of a conventional television receiver. When the actual relative speed is higher or lower than the predetermined speed, the frequency of the horizontal sync pulses recovered from the disc will be respectively, higher or lower than the horizontal scanning rate. The deviation of the actual frequency (of the recovered horizontal sync pulses) from the reference frequency (e.g., 15,734 Hz) is used to develop an error signal. In FIG. 1, circuit means 16 is provided for developing an error signal representative of the deviation of the average speed of the disc from the predetermined speed. The braking system 17, responsive to the error signal, adjusts the speed of the disc in a manner that minimizes the speed error.

Apparatus of FIG. 1 further includes a high frequency error correction system 18 for compensating the errors which are beyond the effective range of the low frequency error correction system 15. Illustratively, the system may be of the type disclosed in the Palmer patent (U.S. Pat. No. 3,711,641). The Palmer system includes a circuit means 19 which receives the horizontal sync pulses recovered by the stylus from the disc, and develops an error signal representative of the deviation of the instantaneous relative speed between the disc and the stylus from the average speed of the disc. A transducer means 20 responsive to the error signal varies the position of the stylus in relation to the disc in a manner that minimizes the error signal.

The composite video signal appearing at the output of the signal processing circuit 14 is coupled to a sync separator 21. The sync separator 21 separates timing information corresponding to the horizontal and the vertical sync pulses from the composite video signal. The horizontal sync pulses are coupled to both the low frequency error correction circuit 16, and the high frequency error correction circuit 19. The output of low frequency error correction circuit 16 operates the braking system 17. The output of the high frequency error correction circuit 19 drives the transducer means 20.

The vertical sync pulses from the sync separator 21 are coupled to a discharge unit 24 of a circuit means 76, which in turn, is coupled to a capacitor 25. In the absence of vertical sync pulses the capacitor 25 charges through a resistor 26 coupled to a source of supply voltage and the resulting voltage operates to control a first threshold device 27. Conversely, in the presence of vertical sync pulses the discharge unit 24 shunts the capacitor 25 to ground, and thereby making the first threshold device 27 inoperative. The low frequency error correction circuit 16 is rendered responsive to the operating condition at the first threshold device 27: that is, the low frequency error correction circuit 16 is disabled when the first threshold device 27 is operative, and enabled when the first threshold device 27 is inoperative. An output of the first threshold device 27 is also coupled to a capacitor 28. When the first threshold device 27 is inoperative in the presence of vertical sync pulses, the capacitor 28 charges through a resistor 29 coupled to the source of supply voltage and the resulting voltage operates to control a second threshold device 30. Conversely, when the first threshold device 27 is operative in the absence of vertical sync pulses, the capacitor 28 is shunted to ground, making the second threshold device 30 inoperative. The second threshold device 30 operates a gate 31 which is coupled in series with the high frequency error correction circuit 19 and the transducer means 20; the gate 31 conducting to enable the transducer means 20 when the second threshold device 30 is operative, but open-circuiting the transducer means 20 when the second threshold device 30 is inoperative.

In the absence of vertical sync pulses over a time interval $T_1$ (illustratively, a period corresponding to an absence of four consecutive vertical sync pulses, e.g., approximately 1/15 second), the capacitor 25 coupled via the resistor 26 to the source of supply voltage, charges to a level sufficient to make the first threshold device 27 operative and the second threshold device 30 inoperative and thereby disabling both the low frequency error correction system 15 and the high frequency error correction system.

The first vertical sync pulse received by the discharge unit 24 shunts the capacitor 25 to ground and makes the first threshold device 27 inoperative, thereby (a) enabling the low frequency error correction system 15, and (b) permitting the capacitor 28 to charge through the resistor 29 coupled to the source of supply voltage. Over a time period $T_2$ (illustratively, one second) after enabling the low frequency error correction system 15, the capacitor 28 charges to a level sufficient to make the second threshold device 30 operative and thereby enabling the transducer means 20.

Figure 2:
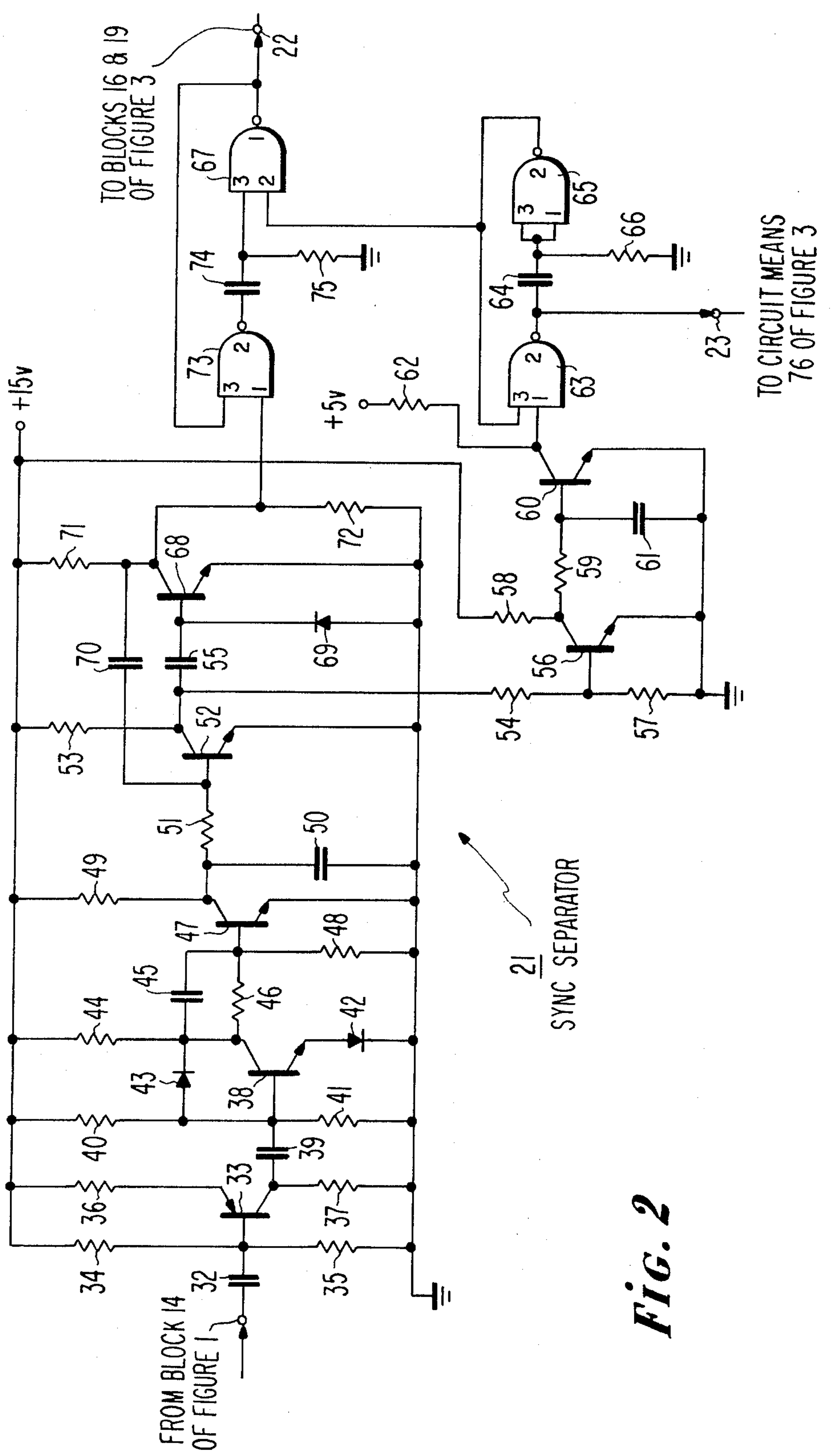
FIG. 2 illustrates a sync separator circuit of FIG. 1, for separating timing information in the form of regularly recurring sync pulses.

FIG. 2 illustrates the sync separator circuit 21 of FIG. 1. The composite video signal appearing at the output of the signal processing circuit 14 is coupled via the capacitor 32 to the base of a transistor 33. Biasing resistors 34 and 35 provide appropriate bias to the base of the transistor 33. A degenerative feedback resistor 36 is coupled between a source of supply voltage, shown here as +15 volts, and the emitter of the transistor 33. A load resistor 37 is coupled between ground and the collector of the transistor 33. Signals derived at the collector of the transistor 33 are coupled to the base of a transistor 38 by a capacitor 39. Appropriate bias is supplied to the base of the transistor 38 by resistors 40 and 41. A clamping diode 42 coupled between ground and emitter of transistor 38, is used to protect the base-emitter junction of the transistor 38 from reverse breakdown. Diode 43 coupled between the base and the collector of the transistor 38 operates to prevent the transistor 38 from saturating. A load resistor 44 is coupled between the source of supply voltage and the collector of the transistor 38. A parallel combination of a capacitor 45 and a resistor 46 couples signals from the collector of the transistor 38 to the base of a transistor 47. Appropriate bias is supplied to the base of the transistor 47 by resistors 44, 46, and 48. The transistor 47 has the emitter coupled to ground and the collector coupled to the first terminals of a load resistor 49, an integrating capacitor 50 and a signal coupling resistor 51. The second terminal of the resistor 49 is coupled to the source of supply voltage. The second terminal of the signal coupling resistor 51 is coupled to the base of a transistor 52. The transistor 52 has the emitter coupled to ground and the collector coupled to the first terminals of a load resistor 53, a coupling resistor 54 and a coupling capacitor 55. The second terminal of the load resistor 53 is coupled to the source of supply voltage. The second terminal of the coupling resistor 54 is coupled to the base of a transistor 56. A bias resistor 57 is coupled between the base of the transistor 56 and ground. The transistor 56 has the emitter coupled to ground and the collector coupled through a load resistor 58 to the source of supply voltage. A resistor 59 is coupled between the collector of the transistor 56 and the base of a transistor 60. An integrating capacitor 61 is coupled between the base of the transistor 60 and ground. A load resistor 62 is coupled between the source of supply voltage and the collector of the transistor 60. Signals derived at the collector of the transistor 60 are coupled to the first terminal of a gate 63. Timing information corresponding to vertical sync pulses derived at the second terminal of the gate 63 are coupled to a terminal 23, and through a timing capacitor 64 to the first and third terminals of a gate 65. The terminal 23 provides timing information (e.g., vertical sync pulses) to the circuit means of FIGS. 1 and 3 for sequencing the operations of the composite error correction system. A timing resistor 66 is coupled between ground and the junction of first and third terminals of the gate 65. Output signals derived at the terminal 2 of the gate 65 are coupled to the third terminal of the gate 63 and the first terminal of a gate 67.

The second terminal of the capacitor 55 is coupled to the base of a transistor 68. A negative clipping diode 69 is coupled between the base of the transistor 68 and ground. The transistor 68 has the emitter coupled to ground and the collector coupled to the first terminals of a speed-up capacitor 70, and to load resistors 71 and 72. The second terminal of speed-up capacitor 70 is coupled to the base of the transistor 52. The second terminal of the load resistor 71 is coupled to the source of supply voltage and the second terminal of the load resistor 72 is coupled to ground. Signals derived at the collector of the transistor 68 are coupled to the first terminal of a gate 73. Signals derived at the second terminal of the gate 73 are coupled to the third terminal of the gate 67 through a timing capacitor 74. A timing resistor 75 is coupled between the third terminal of the gate 67 and ground. Timing information corresponding to horizontal sync pulses derived at the second terminal of the gate 67 is coupled to a terminal 22 and to the third terminal of the gate 73. The terminal 22 provides timing information (e.g., horizontal sync pulses) to the low frequency error correction circuit 16 and to the high frequency error correction circuit 19 of FIGS. 1 and 3. The operation of the sync separator 21 of FIG. 2 will be described subsequently in conjunction with FIG. 4. Illustrative values of the various circuit elements of FIG. 2 are given at the end of the "Description of the Invention".

Figure 3:
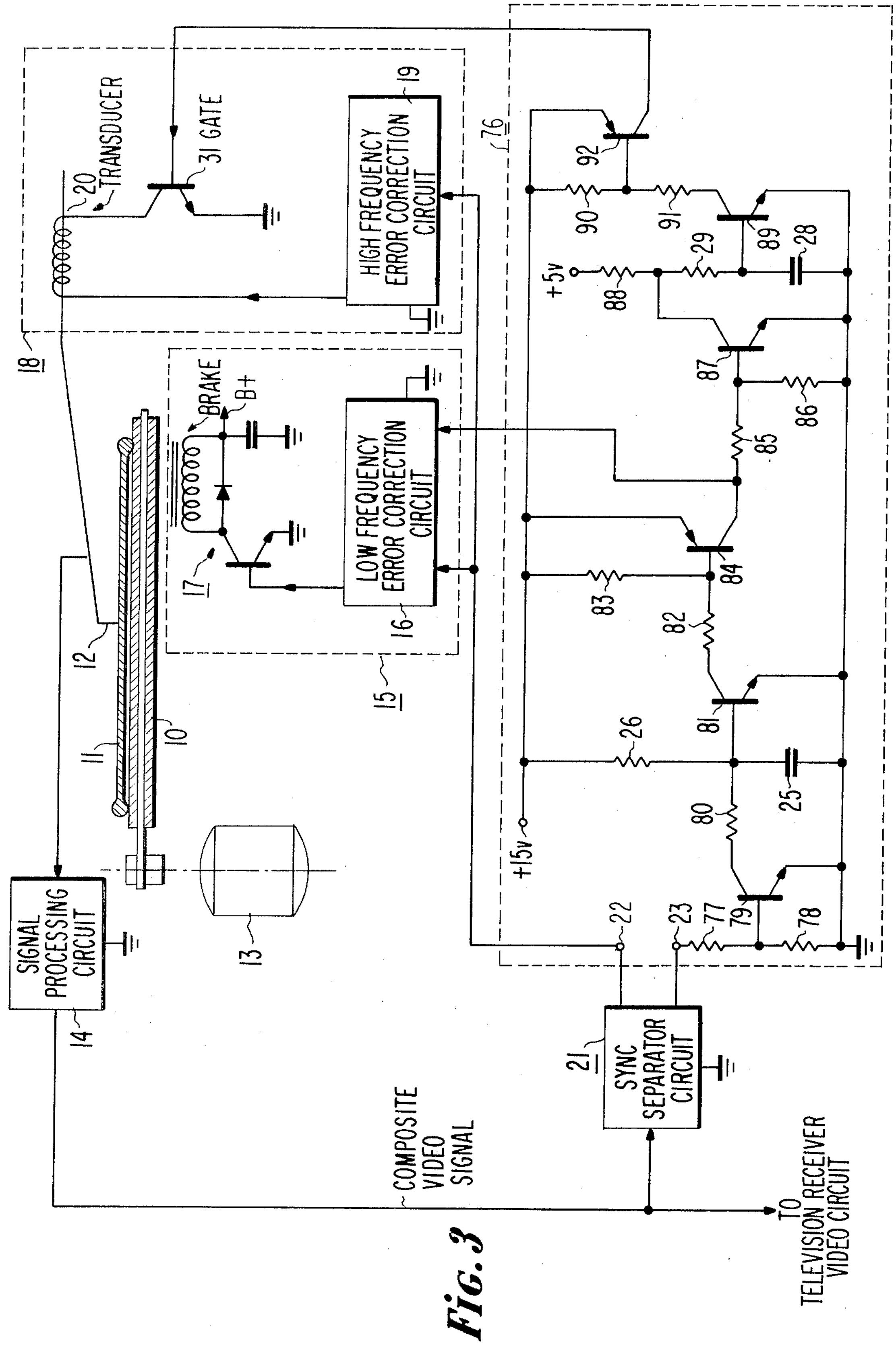
FIG. 3 is a schematic diagram, partly in block form, of a circuit means of FIG. 1, for sequencing the operations of the composite error correction system including a low frequency and a high frequency error correction system.

FIG. 3 illustrates the circuit means 76 of FIG. 1, for sequencing the operations of the composite error correction system. The timing information corresponding to the vertical sync pulses appearing at the terminal 23 is coupled to a series combination of resistors 77 and 78. A transistor 79 has the emitter coupled to ground, the base coupled to the junction of resistors 77 and 78, and the collector coupled through a series combination of resistors 80 and 26 to the source of supply voltage. The capacitor 25 is coupled between the junction of the resistors 80 and 26, and ground. Positive going pulses produced across the resistor 78 cause the transistor 79 to conduct, discharging charge stored on the capacitor 25.

A transistor 81 has the emitter coupled to ground, the base coupled to the junction of the capacitor 25 and the resistor 26, and the collector coupled to the source of supply voltage through a series combination of resistors 82 and 83. Voltage produced across the capacitor 25 operates to turn the transistor 81 "on" and "off" in the absence and the presence of vertical sync pulses respectively. The switching action of the transistor 81 functions to drive a transistor 84. The transistor 84 has the emitter coupled to the source of supply voltage, the base coupled to the junction of resistors 82 and 83, and the collector coupled to the low frequency error correction circuit 16 and to a series combination of resistors 85 and 86. The base of a transistor 87 is coupled to the junction of resistors 85 and 86. The emitter of transistor 87 is coupled to ground and the collector coupled to the junction of a series combination of resistors 29 and 88. The base of a transistor 89 is coupled through the series combination of resistors 88 and 29 to the source of supply voltage. The capacitor 28 is coupled between the base of the transistor 89 and ground. The transistor 89 has the emitter coupled to ground and the collector coupled through a series combination of resistors 90 and 91 to the source of supply voltage. During the presence of vertical sync pulses at terminal 23, the transistors 81, 84, and 87 are cut off and the capacitor 28 is permitted to charge through the series combination of resistors 29 and 88. The voltage produced across the capacitor 28 operates to turn the transistor 89 "on" and "off" during the presence and absence of vertical sync pulses respectively.

The switching action of the transistor 89 causes a transistor 92 to conduct or cut off. The transistor 92 has the base coupled to the junction of resistors 90 and 91 and the emitter coupled to the source of supply voltage and the collector coupled to the base of the transistor 31. The transistor 31 is connected in series with the high frequency error correction circuit 19 and the transducer means 20. The presence of vertical sync pulses allow the capacitor 28 to charge and thereby subsequently making the transistors 89, 92, and 31 operative, enabling the transducer means 20. Conversely, the absence of four consecutive vertical sync pulses shunts the capacitor 28 to ground to cut off the transistors 89, 92, and 31 and thereby disable the transducer means 20. The operation of the circuit means 76 of FIG. 3 will be described subsequently in conjunction with FIG. 5. Illustrative values of the various circuit elements of FIG. 3 are given at the end of the "Description of the Invention."

Figure 4:
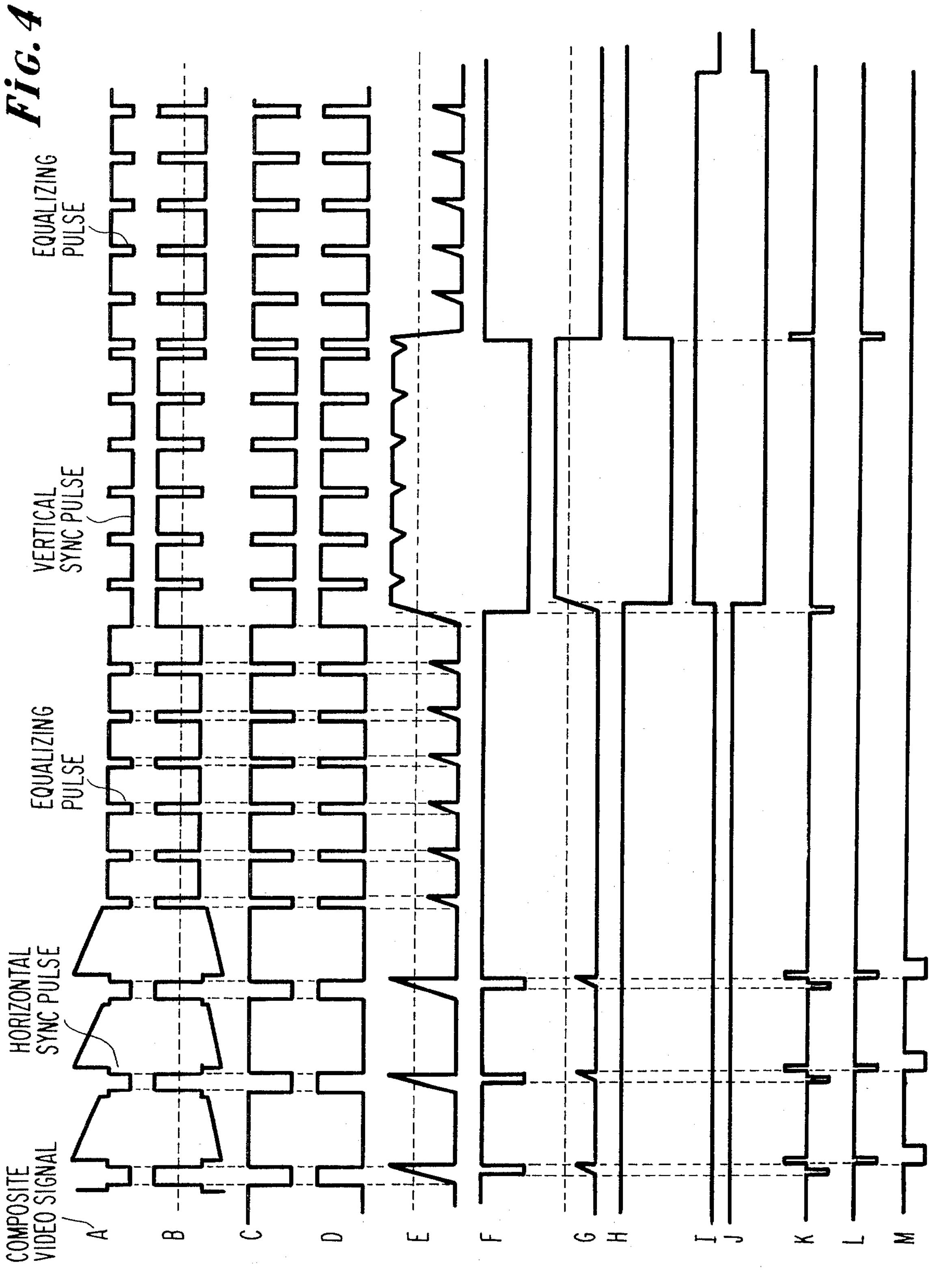
FIG. 4 illustrates waveforms associated with the sync separator circuit of FIGS. 1 and 2.

The operation of the sync separator 21 of FIG. 2 will now be described in conjunction with the waveforms illustrated in FIG. 4. The composite video signal as represented by waveform A, comprising image representative components and regularly recurring components (the horizontal and vertical sync pulses) appear at the base of the transistor 33 of FIG. 2. The transistor 33 amplifies the signal in a nonlinear manner with the negative components (regularly recurring components) amplified to a greater extent than less negative and positive components. The waveform B appearing at the collector of the transistor 33 is coupled to the base of the transistor 38 through the capacitor 39. The waveform C appearing at the collector of the transistor 38 is coupled to the base of the transistor 47. The waveform D would appear at the collector of the transistor 47 in the absence of capacitor 50. The transistor 47 in absence of the sync pulses conducts and keeps the capacitor 50 discharged. During the duration of sync pulses, the transistor 47 is cut off and the capacitor 50 is allowed to charge through the resistor 49 coupled to the source of supply voltage producing a voltage across the capacitor 50 corresponding to waveform E. When the charge on the capacitor 50 exceeds a certain value, the transistor 52 conducts and remains in conduction as long as the voltage applied to its base remains above the certain value. The waveform F appears at the collector of the transistor 52. As can be seen from the waveform F, the transistor 52 does not respond to relatively narrow noise pulses and to the equalizing pulses and, therefore, conducts only during the horizontal and the vertical sync pulses.

The waveform F appearing at the collector of the transistor 52 is coupled to a differentiating circuit comprised of the combination of the capacitor 55, the diode 69 and the base-emitter junction of the transistor 68. The output of the differentiating circuit as illustrated by waveform K is applied to the base of the transistor 68. It is noted that differentiating circuit sets up negative and positive going impulses corresponding to the leading and trailing edges of the applied waveform F. The positive going impulses corresponding to the trailing edges of the waveform F cause conduction of the transistor 68 and produce an output at the collector corresponding to the waveform L. When the waveform L is applied to the terminal 1 at the gate 73, the output at the terminal 2 of the gate 73 goes from zero volts to +5 volts. This causes the capacitively coupled voltage at the terminal 3 of the gate 67 to go from approximately zero volts to +5 volts. If the voltage applied to the terminal 1 of the gate 67 is at +5 volts coincidently with the positive voltage on the terminal 3, then the output at the terminal 2 of the gate 67 will change from +5 volts to zero volts. The capacitor 74 and the resistor 75 are selected to provide a time constant of approximately 5 microseconds, a time interval corresponding to the width of a horizontal sync pulse. The 5 microsecond pulse train appearing at terminal 2 of gate 67 is shown by waveform M and has leading edges corresponding to the trailing edges of the horizontal sync pulses initiating them. The timing information corresponding to the horizontal sync pulses appearing at the terminal 2 is coupled to the low frequency error correction circuit 16 and the high frequency error correction circuit 19 of FIGS. 1 and 3.

The signals appearing at the collector of the transistor 52 (waveform F) are further coupled through the resistor 54 to the base of the transistor 56. The transistor 56 in absence of the sync pulses, conducts and keeps the capacitor 61 discharged. During the duration of sync pulses, the transistor 56 is cut off and the capacitor 61 is allowed to charge through the resistors 58 and 59 coupled to the source of supply voltage. The waveform G appears across the capacitor 61. The relatively narrow pulses corresponding to the horizontal sync pulses provide an insufficient time interval to allow the capacitor 61 to charge to a level sufficient to cause conduction of the transistor 60. The relatively broader vertical sync pulses, however, do supply a sufficient time interval for the capacitor 61 to charge and cause conduction of the transistor 60. The waveform H appears at the collector of the transistor 60. When conduction occurs in the transistor 60, the voltage at the collector change from 5 volts causing this same voltage change to occur at the terminal 1 of the gate 63. A zero volt level at the terminal 1 of the gate 63 causes the output voltage at the terminal 2 of gate 63 to change from zero volts to 5 volts. Positive going pulses (waveform I) corresponding to the vertical sync pulses at terminal 2 of the gate 63 are coupled through terminal 23 to the base of the transistor 79 of FIG. 3. Referring again to FIG. 4, the change in voltage at the terminal 2 of the gate 63 is also imposed upon the terminals 1 and 3 of the gate 65 of FIG. 2, by the capacitor 64 and causes the voltage on the terminal 2 of the gate 65 to change from 5 volts to 0 volts. The voltage on the terminal 2 of the gate 65 (waveform J of FIG. 4) remains at this zero level for abouot 500 microseconds as determined by the time constant of the capacitor 64 and the resistor 66. Thereafter, the voltage at terminal 2 of the gate 65 returns to the quiescent level of 5 volts. During the period of time when the terminal 2 of the gate 65 is at zero volts, the terminal 1 of the gate 67 is held at zero volt level. This inhibits the output (e.g., horizontal sync pulses) of the gate 67 for a period of time (illustratively, 500 microseconds) after a vertical sync pulse is detected by the transistor 60. The inhibition of the gate 67 coincident with the presence of a group of vertical sync pulses is desirable to prevent the false timing information from causing an erroneous operation of the low frequency and the high frequency error correction system 15 and 18. The error correction systems 15 and 18 are designed to operate properly only when they receive timing information corresponding to horizontal sync pulses.

Figure 5:
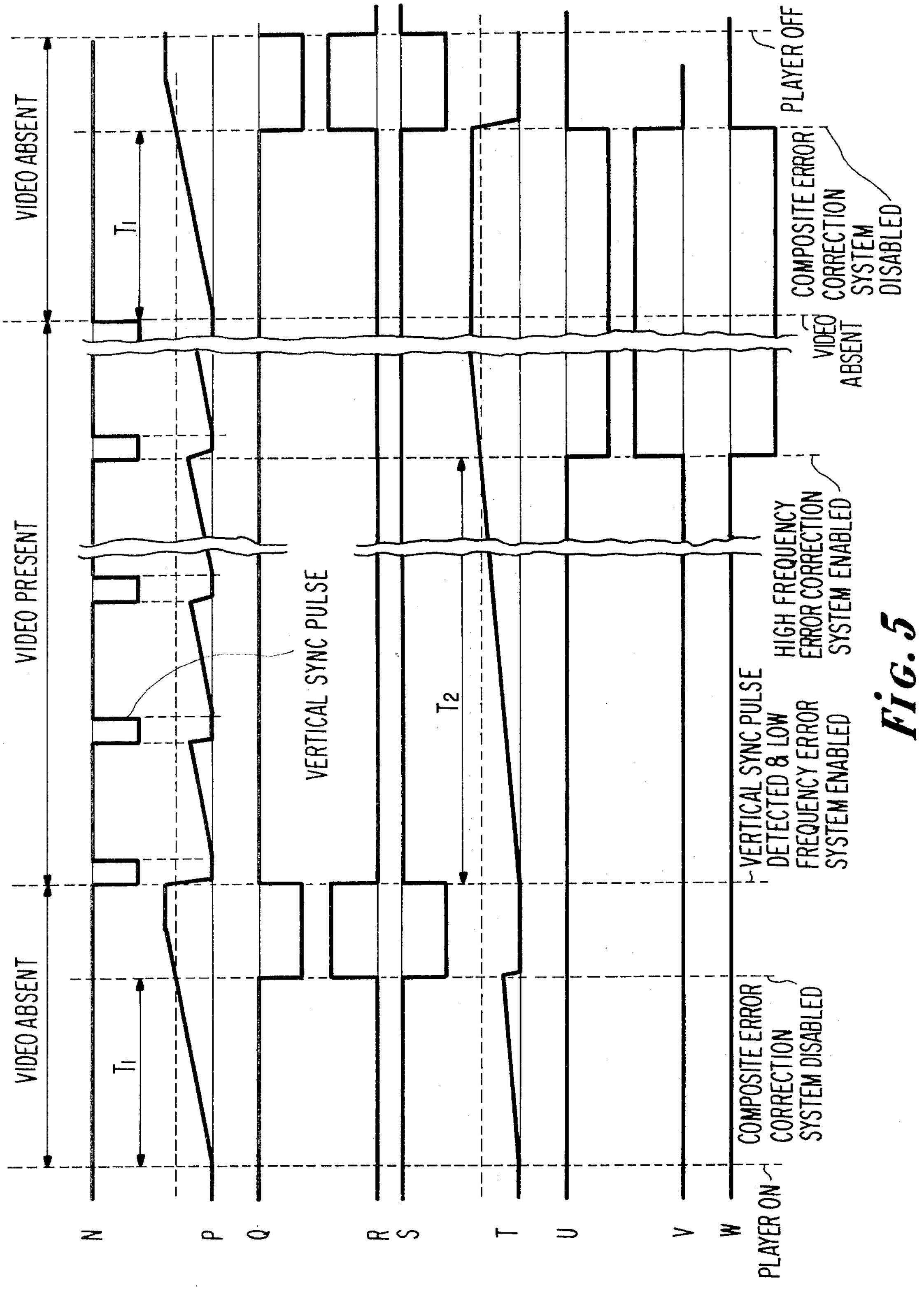
FIG. 5 illustrates waveforms associated with the circuit means of FIGS. 1 and 3 for sequencing the operations of the composite error correction system.

The operation of the circuit means 76 of FIG. 3 will now be described in conjunction with the waveforms illustrated in FIG. 5. The positive going sync pulses (waveform I) corresponding to vertical sync pulses cause conduction of transistor 79 of FIG. 3 and discharge the capacitor 25 to ground. The waveform N (FIG. 5) appears at the collector of the transistor 79. In the absence of vertical sync pulses for a time interval $T_1$, the capacitor 25 coupled through resistor 26 to the source of supply voltage, charges (waveform P) to a level sufficient to cause conduction of the transistor 81. A turn on time $T_1$ (approximately 1/15 second) corresponding to the absence of four consecutive vertical sync pulses is provided to prevent an erroneous activation of the controlled circuit in the event of accidental loss of up to three consecutive vertical sync pulses due to various possible disc manufacturing defects. The waveforms Q, R, and S appear at the collectors of the transistors 81, 84, and 87 respectively. The waveform R appearing at the collector of the transistor 84 is coupled to the low frequency error correction circuit 16 of FIGS. 1 and 3.

The first vertical sync pulse appearing at the base of the transistor 79 causes the transistor 79 to conduct and thereby shunt the capacitor 25 to ground. The transistors 81, 84, and 87 are cut off thereby permitting the capacitor 28 to charge (waveform T of FIG. 5) through the resistors 29 and 88 coupled to the source of supply voltage. When the transistor 84 is cut off, the voltage appearing at the collector goes from a positive value to zero, which in turn, enables the low frequency error correction circuit 16. After a time period $T_2$ (illustratively, one second) the capacitor 28 charges to a level sufficient to make the transistors 89, 92, and 31 to conduct. The waveforms U, V, and W appear at the collectors of the transistors 89, 92, and 31 respectively. The transistor 31 is connected in series with the high frequency error correction circuit 19 and the transducer means 20.

In summary, an absence of sync pulses at the output of the sync separator 21 for a period corresponding to four consecutive vertical sync pulses disables both the low frequency error correction circuit 16 of the low frequency error correction system 15, and the transducer means 20 to the high frequency error correction system 18 substantially immediately. As the horizontal sync pulses appear at the output to the sync separator 21, they are supplied to both the low frequency error correction circuit 16 and the high frequency error correction circuit 19. The disabling of the low frequency error correction circuit 16 prevents it from responding to the horizontal sync pulses until the low frequency error correction circuit is subsequently enabled in response to the presence of a vertical sync pulse. The high frequency error correction circuit 19 develops an output signal in response to the receipt of the horizontal sync pulses from the sync separator 21, but it is not able to acutate the transducer means 20 until the transducer means are subsequently enabled after an elapse of a predetermined time interval $T_2$ following enabling of the low frequency error correction circuit 16. The presence of a vertical sync pulse enables the operation of the low frequency error correction circuit 16 and thereby the low frequency error correction system 15 substantially immediately. The operation of the transducer means 20 is delayed relative to enabling of the low frequency error correction system 15 and the high frequency error correction circuit 19, permitting, (a) stabilization of the high frequency error correction circuit response, and (b) adjustment of the average speed of the disc to the predetermined speed, to precede the operation of the transducer means 20.

Illustratively, the values of the circuit elements are as follows:

| | | |
|---|---|---|
| A. | FIGURE 2 (Capacitors): | |
| | Capacitor 32 | 50 Microfarads |
| | Capacitor 39 | 6800 Microfarads |
| | Capacitor 45 | 0.00018 Microfarads |
| | Capacitor 50 | 3900 Microfarads |
| | Capacitor 55 | 0.00015 Microfarads |
| | Capacitor 61 | 10,000 Microfarads |
| | Capacitor 64 | 10,000 Microfarads |
| | Capacitor 70 | 0.00010 Microfarads |
| | Capacitor 74 | 10,000 Microfarads |
| B. | FIGURE 2 (Resistors): | |
| | Resistor 34 | 1.20 Kilohms |
| | Resistor 35 | 11.00 Kilohms |
| | Resistor 36 | 0.36 Kilohms |
| | Resistor 37 | 2.70 Kilohms |
| | Resistor 40 | 0.75 Kilohms |
| | Resistor 41 | 91.00 Kilohms |
| | Resistor 44 | 3.30 Kilohms |
| | Resistor 46 | 10.00 Kilohms |
| | Resistor 48 | 3.00 Kilohms |
| | Resistor 49 | 16.00 Kilohms |
| | Resistor 51 | 0.47 Kilohms |
| | Resistor 53 | 3.30 Kilohms |
| | Resistor 54 | 20.00 Kilohms |
| | Resistor 57 | 3.30 Kilohms |
| | Resistor 58 | 10.00 Kilohms |
| | Resistor 59 | 0.20 Kilohms |
| | Resistor 62 | 5.10 Kilohms |
| | Resistor 66 | 0.47 Kilohms |
| | Resistor 71 | 5.10 Kilohms |
| | Resistor 72 | 1.50 Kilohms |
| | Resistor 75 | 0.47 Kilohms |
| C. | FIGURE 2 (Diodes): | |
| | Diodes 42, 69 | IN914 |
| | Diode 43 | IN60 |
| D. | FIGURE 2 (Gates): | |
| | Gates 63, 65, 67, and 73 | SN7400 |
| E. | FIGURE 2 (Transistors): | |
| | Transistor 33 | 2N4250 |
| | Transistors 38, 47, 52, 68 56, and 60 | 2N3691 |
| F. | FIGURE 3 (Capacitors): | |
| | Capacitor 25 | 10 Microfarads |
| | Capacitor 28 | 100 Microfarads |
| G. | FIGURE 3 (Resistors): | |
| | Resistor 77 | 1.00 Kilohms |
| | Resistor 78 | 1.00 Kilohms |
| | Resistor 80 | 0.051 Kilohms |
| | Resistor 26 | 0.30 Kilohms |
| | Resistor 29 | 47.00 Kilohms |
| | Resistor 82 | 33.00 Kilohms |
| | Resistor 83 | 6.20 Kilohms |
| | Resistor 85 | 22.00 Kilohms |
| | Resistor 86 | 3.30 Kilohms |
| | Resistor 88 | 1.00 Kilohms |
| | Resistor 90 | 3.30 Kilohms |
| | Resistor 91 | 5.60 Kilohms |
| H. | FIGURE 3 (Transistors): | |
| | Transistors 84, 92 | 2N4250 |
| | Transistors 79, 81, 87, and 89 | 2N3691 |

What is claimed is:

1. In a disc playback system including an apparatus for recovering recorded signals from a spirally grooved disc record, said apparatus including a pickup device subject to positioning in the disc record groove for developing a recorded signal output, and means for rotating said disc record to establish relative motion between said disc record groove and said pickup device, wherein a predetermined speed of said relative motion is desired for proper operation of said apparatus, a speed correction system comprising:

1. first speed error correction means for adjusting the speed of rotation of said record to maintain the average speed of said relative motion at substantially the predetermined speed when the operation of said first speed error correction means is initiated;
2. second speed error correction means for supplementing the speed error correction afforded by said first speed error correction means, said second speed error correction means including:

A. circuit means responsive to the signal output of said pickup device for developing an error signal representative of deviations of the instantaneous relative speed between said disc record groove and said pickup device from said predetermined speed; and B. transducer means, coupled to said circuit means and normally responsive to said error signal, for varying the position of said pickup device in relation to said disc record groove in a manner that opposes said deviations; and 3. means responsive to the presence of said recorded signals in the output of said pickup device for delaying the operation of said transducer means relative to initiation of said first speed error correction means operation, thereby permitting (a) adjustment of the average speed of said relative motion to substantially the predetermined speed, and (b) stabilization of said circuit means for developing an error signal, to precede the operation of said transducer means.

2. A speed correction system as defined in claim 1 further including a control means responsive to the presence of said recorded signals in the output of said pickup device for initiating the operation of said first speed error correction means and said circuit means for developing an error signal.

3. A speed correction system as defined in claim 1 wherein said transducer means includes a means for supporting said pickup device, said supporting means being subject to a correcting motion in response to the error signal output of said circuit means.

4. A speed error correction system as defined in claim 1 wherein the free running speed of rotation of said record provided by said record rotating means is above said predetermined speed, and wherein said first speed error correction means comprises:

means for developing a second error signal representative of deviations of the average speed of said storage medium from the predetermined speed; and means responsive to said error signal for braking said record rotating means in a manner that opposes said average speed deviations.

5. A speed error correction system as defined in claim 2 wherein said control means, in response to the absence of said recorded signals at the output of said pickup device, disables the operation of said first speed error correction means and said transducer means.

6. In a record playback system including an apparatus for recovering recorded signals from a storage medium by a pickup device, and means for driving said storage medium for establishing relative motion between said storage medium and said pickup device, wherein a predetermined speed of said relative motion is desired for proper operation of said apparatus, a speed correction system comprising:

low frequency error correction means for maintaining the average speed of said storage medium at substantially the predetermined speed;

circuit means responsive to recorded signals recovered by said pickup device for developing an error signal representative of the deviation of the instantaneous relative speed between said storage medium and said pickup device from the average speed of said storage medium;

transducer means, electrically coupled to said circuit means and mechanically coupled to said pickup device, for varying the position of said pickup device in relation to said storage medium in a manner that minimizes said error signal;

control means responsive to the initial presence of said recorded signals in the output of said pickup device for enabling the operation of said low frequency error correction means and said circuit means at the beginning of playback; and means coupled to said control means for delaying the operation of said transducer means relative to enabling of said low frequency error correction means and said circuit means for developing an error signal, thereby permitting (1) initial adjustment of the average speed of said storage medium to substantially the predetermined speed, and (2) stabilization of said circuit means, to precede the operation of said transducer means;

wherein speed error correction by said transducer means supplements speed error correction by said low frequency error correction means during playback, subsequent to said initial speed adjustment and said circuit means stabilization, to maintain the instantaneous relative speed between said storage medium and said pickup device substantially at said predetermined speed.

7. A speed correction system as defined in claim 6 wherein said transducer means includes a means for supporting said pickup device, said supporting means being subject to a correcting motion in response to the error signal output of said circuit means.

8. A speed correction system as defined in claim 6 wherein said means for driving said storage medium is adapted to provide a free running speed for said storage medium which is above said predetermined speed, and wherein said low frequency error correction means comprises:

means for developing an error signal representative of the deviation of the average speed of said storage medium from the predetermined speed; and means responsive to said error signal for braking said storage medium in a manner that minimizes said error signal.

9. A speed error correction system as defined in claim 6 wherein said control means, in response to the absence of said recorded signals at the output of said pickup device, disables the operation of said low frequency error correction means and said transducer means.

10. In a video disc playback system, including apparatus for recovering recorded composite video signals, inclusive of synchronizing components, from a spirally grooved video disc record, said apparatus including a pickup device subject to positioning in the video disc record groove for providing an output comprising the recorded composite video signals, and means for rotating said disc record to establish relative motion between said disc record groove and said pickup device, wherein a predetermined speed of said relative motion is desired for operation of said apparatus; a speed correction system comprising:

transducer means, mechanically coupled to said pickup device, for varying the position of said pickup device in relation to said disc record groove;

circuit means, coupled to the output of said pickup device and responsive to synchronizing components of recorded composite video signals appearing in said output, for developing an error signal indicative of deviations of the instantaneous relative speed between said disc record groove and said pickup device from said predetermined speed;

means for applying said error signal to said transducer;

control means, coupled to the output of said pickup device, for developing an enabling signal in response to the presence of synchronizing components in said output, said control means including means for delaying the initiation of said enabling signal development relative to the initiation of error signal development by said circuit means; and a control device, electrically coupled to said transducer means and responsive to the enabling signal developed by said control means, for enabling said transducer means to respond to said error signal by varying the position of said pickup device in a manner opposing said deviations; said control device serving to preclude said transducer means from responding to said error signal in the absence of said enabling signal.

11. A speed correction system in accordance with claim 10 also including average speed error correcting means, to which said record rotating means is responsive, for adjusting the average speed of said relative motion to substantially said predetermined speed prior to said enabling of said transducer means and for maintaining the average speed of said relative motion substantially at said predetermined speed during the operation of said transducer means.

* * * * *